United States Patent
Yamaguchi

[11] Patent Number: 5,976,734
[45] Date of Patent: Nov. 2, 1999

[54] PREPARATION PROCESS OF COLOR LIQUID CRYSTAL DISPLAY DEVICE

[75] Inventor: Nobuhito Yamaguchi, Inagi, Japan

[73] Assignee: Canon Kabushiki Kaisha, Tokyo, Japan

[21] Appl. No.: 09/087,771

[22] Filed: Jun. 1, 1998

[30] Foreign Application Priority Data

Jun. 2, 1997 [JP] Japan .................................. 9-142866

[51] Int. Cl.⁶ .......................... G02B 5/20; G02F 1/1335
[52] U.S. Cl. .................. 430/7; 430/313; 430/319
[58] Field of Search .................. 430/7, 321, 313, 430/314, 319; 349/106, 143; 347/106

[56] References Cited

U.S. PATENT DOCUMENTS 5,681,675  10/1997  Kurauchi et al. ........................ 430/20

FOREIGN PATENT DOCUMENTS

| | | |
|---|---|---|
| 075205 | 4/1984 | Japan . |
| 109002 | 5/1987 | Japan . |
| 2235901 | 9/1988 | Japan . |
| 217302 | 8/1989 | Japan . |
| 2-302727 | 12/1990 | Japan . |
| 3-156425 | 7/1991 | Japan . |
| 4-299312 | 10/1992 | Japan . |
| 075916 | 3/1996 | Japan . |
| 227012 | 9/1996 | Japan . |

*Primary Examiner*—John A. McPherson
*Attorney, Agent, or Firm*—Fitzpatrick, Cella, Harper & Scinto

[57] ABSTRACT

Disclosed herein is a process for the preparation of a color liquid crystal display device charged with a liquid crystal into a space between a substrate having pixel electrodes and an opposite substrate thereto, which comprises the steps of forming an electroconductive layer on the substrate, on which the pixel electrodes will be provided, forming a patterned photosensitive resin layer on the electroconductive layer, patterning the electro-conductive layer through the patterned photosensitive resin layer to form the pixel electrodes, and coloring the patterned photosensitive resin layer to form respective color filters.

6 Claims, 4 Drawing Sheets

PREPARATION PROCESS OF COLOR LIQUID CRYSTAL DISPLAY DEVICE

BACKGROUND OF THE INVENTION

1. Field of the Invention

The present invention relates to a process for the preparation of a color liquid crystal display device suitable for use in color televisions, personal computers and the like, and a color liquid crystal display device produced thereby.

2. Related Background Art

With the advancement of personal computers, particularly, portable personal computers in recent years, the demand for liquid crystal display devices, particularly, color liquid crystal display devices tends to increase. It is however necessary to reduce the cost of the color liquid crystal display devices for further spreading them. There is an increasing demand for reduction in the cost of color filters particularly given much weight from the viewpoint of the cost.

Various processes have heretofore been attempted for meeting the above demand while satisfying properties required of the color filters. However, no process satisfying all the required properties is yet established under the circumstances. The typical processes for the preparation of color filters will hereinafter be described.

The first method is a pigment dispersing process. In this process, a layer of a photosensitive resin, in which a pigment has been dispersed, is first formed on a base and then subjected to patterning, thereby obtaining a pattern of a single color. This step is repeatedly performed three times, thereby forming a color filter composed of colored patterns of R (red), G (green) and B (blue).

The second method is a dyeing process. In the dyeing process, a water-soluble polymeric material, which is a material to be dyed, is applied to a base, and the coating film thus formed is patterned in the desired form by a photolithographic process. Thereafter, the base on which the coating film has been patterned is immersed in a dye bath to obtain a colored pattern. This step is repeatedly performed three times to form a color filter composed of colored patterns of R, G and B.

As the third method, there is an electrodepostion process. In this process, a transparent electrode is first patterned on a base. The base is then immersed in an electrodeposition coating fluid containing a pigment, a resin, an electrolytic solution and the like to electrically deposit the first color. This step is repeatedly performed three times, thereby forming a color filter layer composed of colored patterns of R, G and B. Finally, this color filter layer is calcined to form a color filter.

The fourth method is a process in which pigments are separately dispersed in a thermosetting resin, the resultant thermosetting resin dispersions of R, G and B colors are separately applied to a base by repeating printing three times, and the resin portions thus applied are then thermoset to form a layer composed of colored patterns of R, G and B, thereby forming a color filter.

It is general to form a protective film on the colored layer in each process.

The need of repeating the same step three times to form the colored patterns of R, G and B is common to these processes. Therefore, the production cost is necessarily increased. There is also offered a problem that a yield is reduced as the number of steps increases. Besides, in the electrodeposition process, formable patterns are limited. It is hence difficult to apply this process to a TFT color liquid crystal display device in the existing technique. Further, the printing process involves a drawback that resolution is poor, and is hence unfit to form fine-pitch patterns.

In order to eliminate these drawbacks, processes for producing a color filter by using an ink-jet system have been proposed in Japanese Patent Application Laid-Open Nos. 59-75205, 62-109002, 63-235901, 1-217302, etc.

In particular, the following problems arise upon the production of a color filter according to the ink-jet system.

(1) Color mixing at boundaries between adjacent pixels of different colors; and (2) Blank areas occurred at boundaries between colored portions and black matrices, and color irregularity caused by the distribution of optical density in colored pixels.

A method for preventing the color mixing at boundaries between adjacent pixels in a color filter has been proposed in Japanese Patent Application Laid-Open No. 8-75916. According to this method, ink-phobic portions are formed by exposure using a photomask, thereby bringing about an effect of preventing the color mixing between inks. However, this process requires to newly produce a mask for exposure when a cell size is changed due to a change in the size or resolution of a liquid crystal display device, or the like. The exposure step in this process is required to align with black matrices with high precision, and so the process is disadvantageous from the viewpoints of yield and cost.

Therefore, a method to conduct back side exposure using black matrices in place of a mask has been proposed (refer to Japanese Patent Application Laid-Open No. 8-227012).

On the other hand, black matrices are subject to such wide variations as their material is Cr or a resin, and they are provided on a substrate opposite to a color filter substrate or on a TFT substrate. Accordingly, the process for the preparation of a color filter must be changed according to the type of black matrices.

SUMMARY OF THE INVENTION

It is therefore an object of the present invention to provide a color liquid crystal display device having excellent color display characteristics at a low cost, and more specifically to provide a preparation process of the above excellent liquid crystal display device, in which a color filter free of any blank area and color mixing is formed with good yield by a simple process without need of high-precision alignment with black matrices and change in process according to black matrices, and a liquid crystal display device produced by such a preparation process.

The above object can be achieved by the present invention described below.

According to the present invention, there is thus provided a process for the preparation of a color liquid crystal display device charged with a liquid crystal into a space between a substrate having pixel electrodes and an opposite substrate thereto, which comprises the steps of forming an electro-conductive layer on the substrate, on which the pixel electrodes will be provided; forming a patterned photosensitive resin layer on the electro-conductive layer; patterning the electroconductive layer through the patterned photosensitive resin layer to form the pixel electrodes; and coloring the patterned photosensitive resin layer to form respective color filters.

According to the present invention, there is also provided a color liquid crystal display device charged with a liquid crystal into a space between a substrate having pixel electrodes and an opposite substrate thereto, wherein a portion of a photosensitive resin layer on each of the pixel electrodes is colored to provide a color filter.

According to the present invention, there is further provided a process for the preparation of a color liquid crystal display device provided with a liquid crystal into a space between a substrate having pixel electrodes and an opposite substrate thereto, which comprises the steps of forming an electroconductive layer on the substrate, on which the pixel electrodes will be provided; forming a resin layer on the electroconductive layer; forming a patterned resist on the resin layer; patterning the electroconductive layer and the resin layer at the same time through the patterned resist to form the pixel electrodes; and coloring the patterned resin layer to form respective color filters.

When a means for applying the color inks to the patterned photosensitive resin layer or the patterned resin layer in the present invention is of an ink-jet system, a plurality of the color inks may be applied by one step, and so the color liquid crystal display device can be produced with higher yield at lower cost.

DESCRIPTION OF THE PREFERRED EMBODIMENTS

Figure 1:
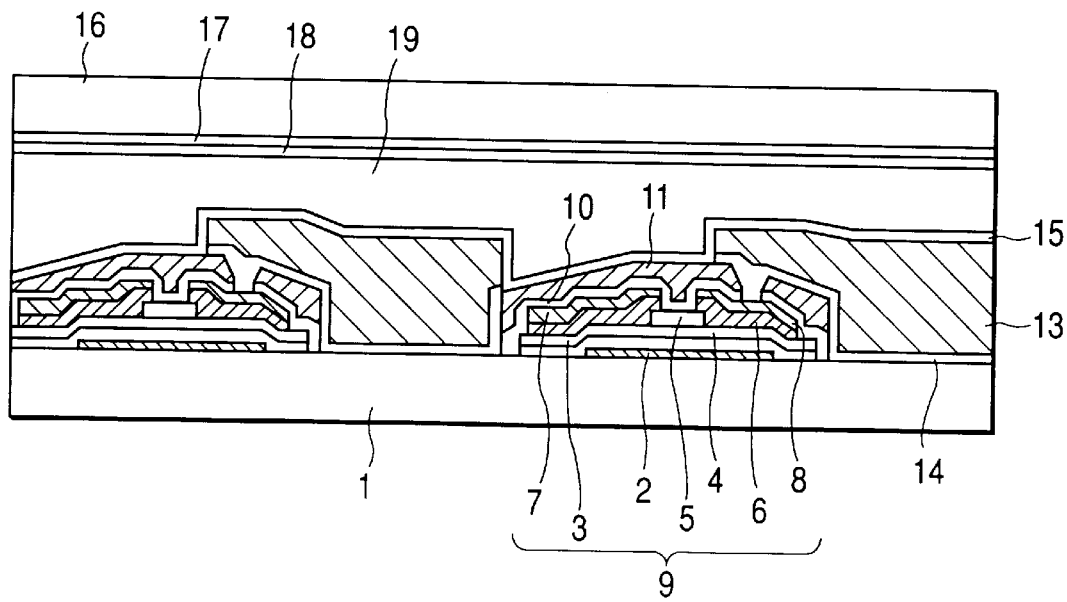
FIG. 1 is a partially cross-sectional view illustrating a color liquid crystal display device according to an embodiment of the present invention.
Figure 2A:
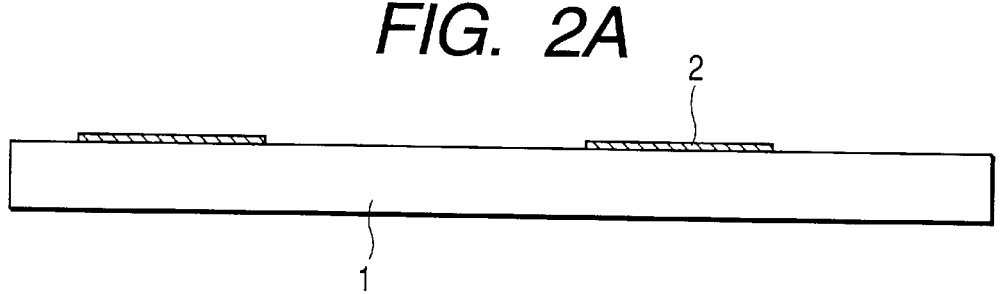
FIGS. 2A, 2B, 2C, 2D, 2E, 2F, 2G, 2H, 2I, 2J and 2K are partially cross-sectional views illustrating a process for the preparation of the color liquid crystal display device according to an embodiment of the present invention.
Figure 2B:
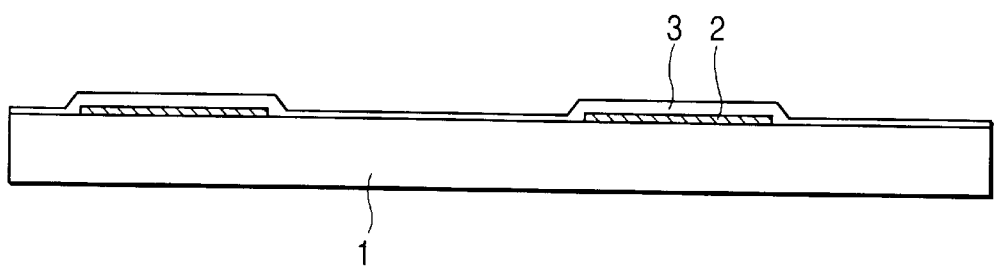
Figure 2C:
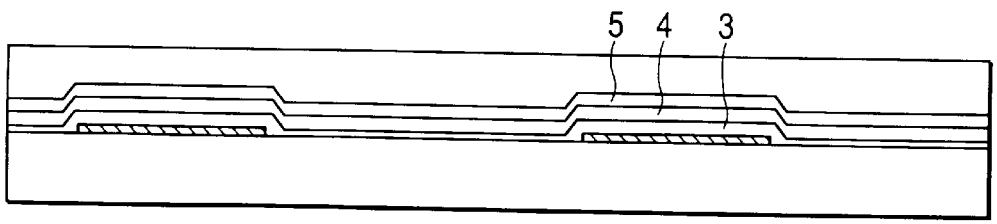
Figure 2D:
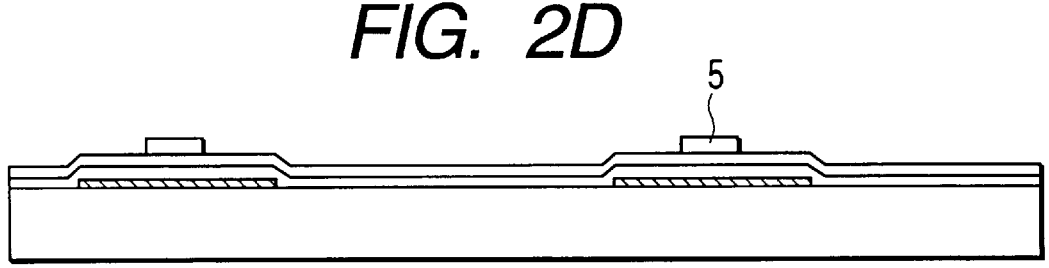
Figure 2E:
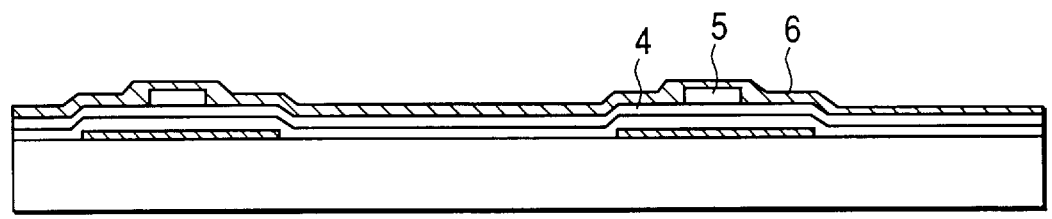
Figure 2F:
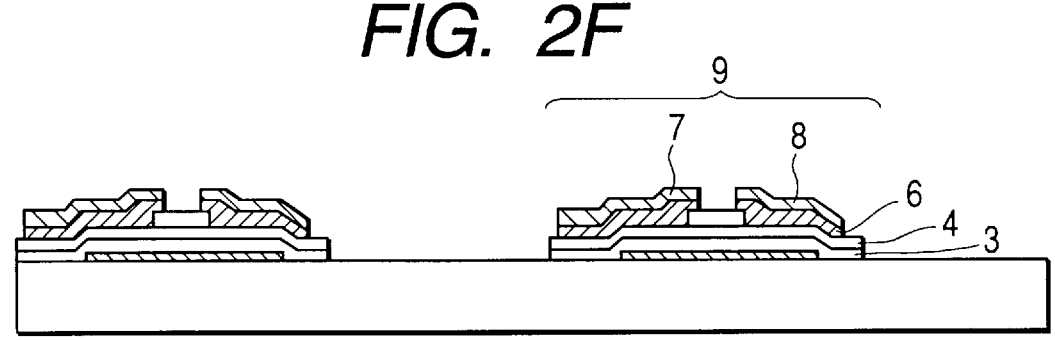
Figure 2G:
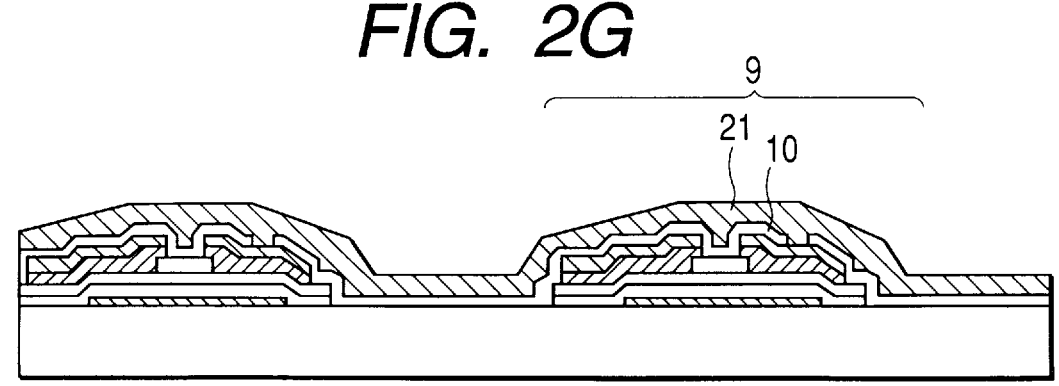
Figure 2H:
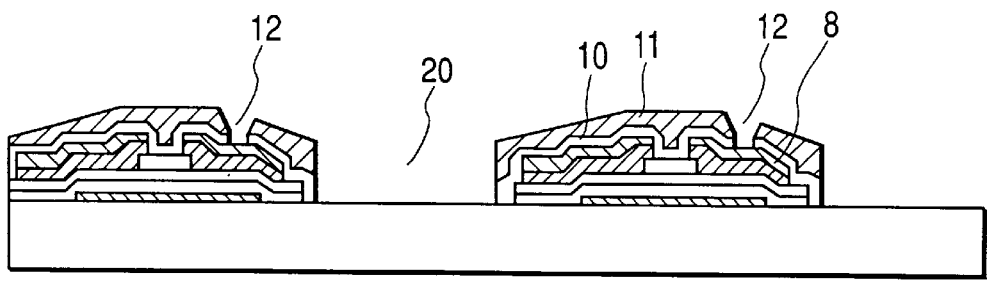
Figure 2I:
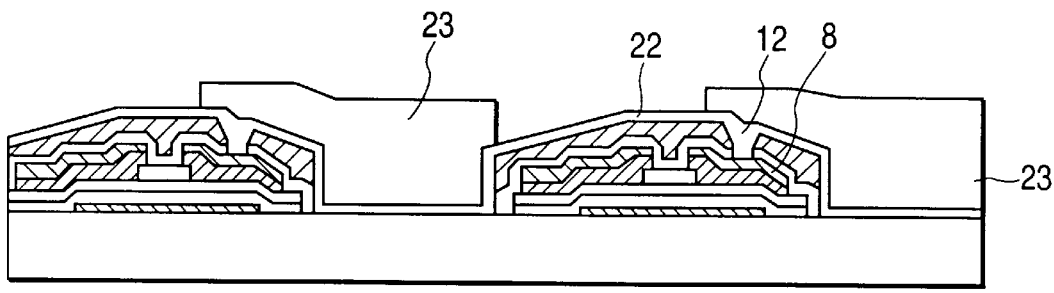
Figure 2J:
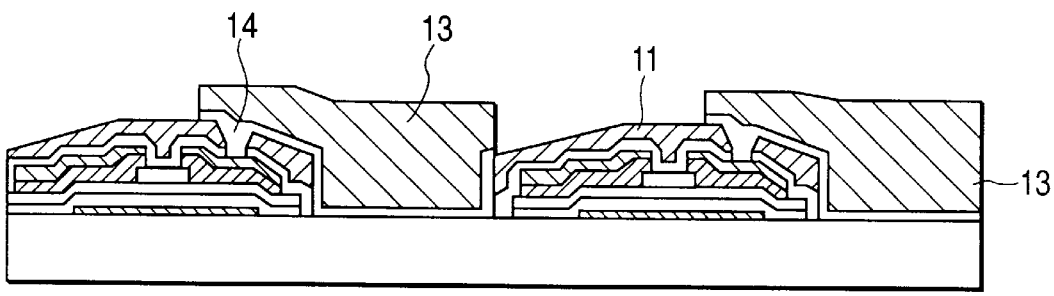
Figure 2K:
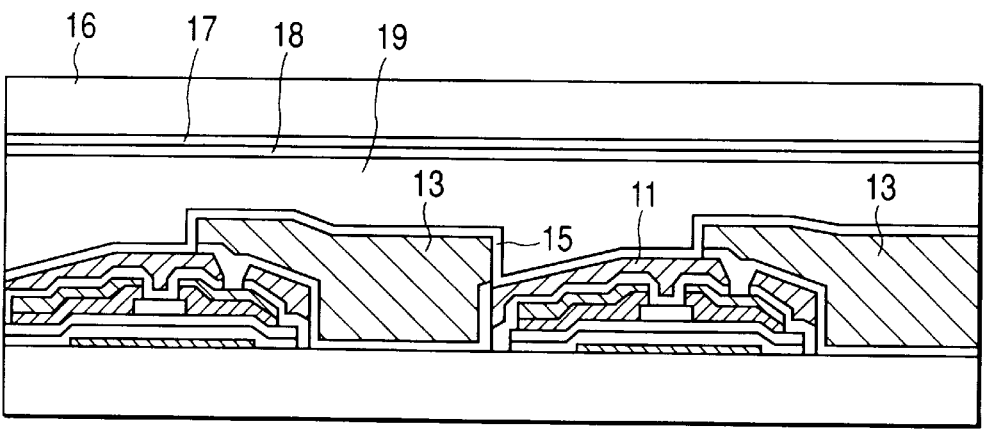

FIG. 1 is a partially cross-sectional view of the color liquid crystal display device according to an embodiment of the present invention. This color liquid crystal display device is an active matrix type liquid crystal display device using TFTS. In FIG. 1, reference numeral 1 is a glass substrate, 2 is a gate electrode, 3 is a gate insulating film, 4 is an i-type amorphous silicon film, 5 is an etching stopping layer, 6 is an ohmic contact layer, 7 is a source electrode, 8 is a drain electrode, 9 is a TFT, 10 is a passivation film, 11 is a black matrix, 13 is a color filter, 14 is a pixel electrode, 15 is an alignment film, 16 is a glass substrate, 17 is a transparent common electrode, 18 is an alignment film, and 19 is a liquid crystal compound.

Examples of the preparation of this color liquid crystal display device by the preparation processes of the present invention will hereinafter be described.

FIGS. 2A to 2K are partially cross-sectional views illustrating the preparation steps of the preparation process according to the first embodiment of the present invention. The following Steps (a) to (k) correspond to FIGS. 2A to 2K, respectively.

Step (a):

Gate electrodes 2 are formed of, for example, Cr or Ta in a film thickness of preferably about 2,000 angstroms on a glass substrate 1.

Step (b):

A gate insulating film 3 is formed in a film thickness of preferably about 5,000 angstroms on the gate electrodes 2. A single-layer film formed of, for example, SiN, $Si_3N_4$, TaO or $Ta_2O_5$, or a multi-layer film obtained by laminating these insulating films is used for the gate insulating film 3.

Step (c):

An i-type amorphous silicon film 4 and an etching stopping layer 5 are formed in a film thickness of preferably about 2,000 angstroms on the gate insulating film 3. The etching stopping layer 5 serves to protect the i-type amorphous silicon film 4 so as not to damage the i-type amorphous silicon film 4, which will form channel regions, by etching in Step (f), which will be described subsequently, and is formed with a material different in etching rate from, in particular, the i-type amorphous silicon film 4 and an ohmic contact layer, for example, an insulating film of SiN, $Si_3N_4$ or the like.

Step (d):

The etching stopping layer 5 is subjected to patterning.

Step (e):

The ohmic contact layer 6 is formed in a film thickness of preferably about 3,000 angstroms on the i-type amorphous silicon film 4 and the etching stopping layer 5. For example, $n^+$-type amorphous silicon or microcrystalline silicon is used for the ohmic contact layer 6.

Step (f):

Source electrodes 7 and drain electrodes 8 are formed on the ohmic contact layer 6, and unnecessary portions of the ohmic contact layer 6, i-type amorphous silicon film 4 and gate insulating film 3 are removed by etching to form TFTs 9. For example, Al or Mo is used for the source electrodes 7 and the drain electrodes 8.

Step (g):

The TFTs 9 are covered with a passivation film 10 formed of, for example, SiN, and a resin layer 21 for forming black matrices 11 is formed on the passivation film 10. A photosensitive acrylic resin, in which carbon black or a mixture of red, green and blue pigments has been dispersed, is used for the resin layer 21. After this resin is applied to form a layer of the photosensitive resin, the resin layer 21 is exposed through a mask.

Step (h):

Portions of the passivation film 10 and the resin layer 21 corresponding to opening areas 20 are removed by development to form a black matrix 11 and a contact hole 12 in the black matrix 11 on each of the drain electrodes 8.

Step (i):

An ITO layer 22 is deposited by sputtering on the black matrices 11 and the substrate 1 and connected to the drain electrodes 8 through the respective contact holes 12. A photosensitive resin layer 23 having ink receptibility is formed on the ITO layer 22. A mixture of an acrylamide resin and an acrylate resin is preferably used as a resin for the photosensitive resin. Besides, natural polymeric materials such as gelatin, casein and glue and synthetic polymeric materials such as PVA (polyvinyl alcohol) and PVP (polyvinyl pyrrolidone) may also be used. Any photosensitive resin may be used so far as it is that obtained by adding a chromate, bichromate, diazo compound, stilbazole or the like to any of these resins to impart photosensitivity thereto. The photosensitive resin layer 23 is patterned by irradiating it with light through a photomask having a pattern of pixel electrodes and removing unexposed portions.

Step (j):

The patterned photosensitive resin layer 23 is used to pattern the ITO layer 22, thereby forming the pixel electrodes 14. Color inks of red, green and blue are then applied to the patterned photosensitive resin layer 23 according to the pattern to form respective color filters 13. As a means for applying the color inks in the present invention, that by an ink-jet system is preferred from the viewpoint of shortening the process. As the color inks, may preferably be used water-based inks. In order to avoid the color mixing between adjacent color filters, it is desirable that the black matrices 11 should be allowed to contain an ink-repellent compound in advance so as to absorb the color inks quickly into the photosensitive resin layer 23. When water-based inks are used as the color inks, the ink repellency of the black matrices may be useful for effectively preventing the color mixing.

As the ink-jet system used in the present invention, a bubble-jet type making use of an electrothermal converter as an energy-generating element or a piezo-jet type making use of a piezoelectric element may be used. An application area of each ink and a pattern thereof may be optionally preset.

After the color inks have been sufficiently penetrated into the photosensitive resin layer 23, the photosensitive resin layer 23 is dried and washed to remove excess inks, and the color inks are subjected to a drying and fixing treatment to form the color filters 13.

Step (k):

An alignment film 15 composed of, for example, polyimide is formed over the whole surface of the TFTs 9 and color filters 13.

On the other hand, an opposite glass substrate 16 on which a transparent common electrode 17 and an alignment film 18 have been formed is arranged with a space of preferably about 5 mm in opposed relation to the TFT substrate fabricated through the above-described steps, and a liquid crystal 19 is charged into the space between both substrates.

As described above, since the patterned photosensitive resin layer used for the patterning of the pixel electrodes is used as a color filter in the color liquid crystal display device according to the present invention, the preparation process of the color filter is greatly shortened.

Figure 3A:
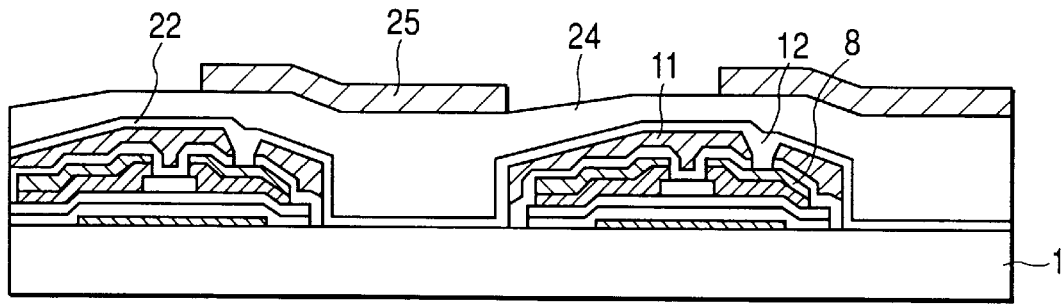
FIGS. 3A, 3B and 3C are partially cross-sectional views illustrating a part of a process for the preparation of the color liquid crystal display device according to another embodiment of the present invention.
Figure 3B:
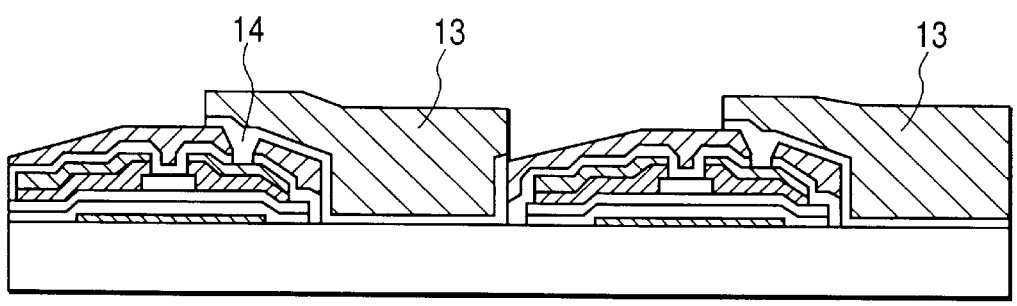
Figure 3C:
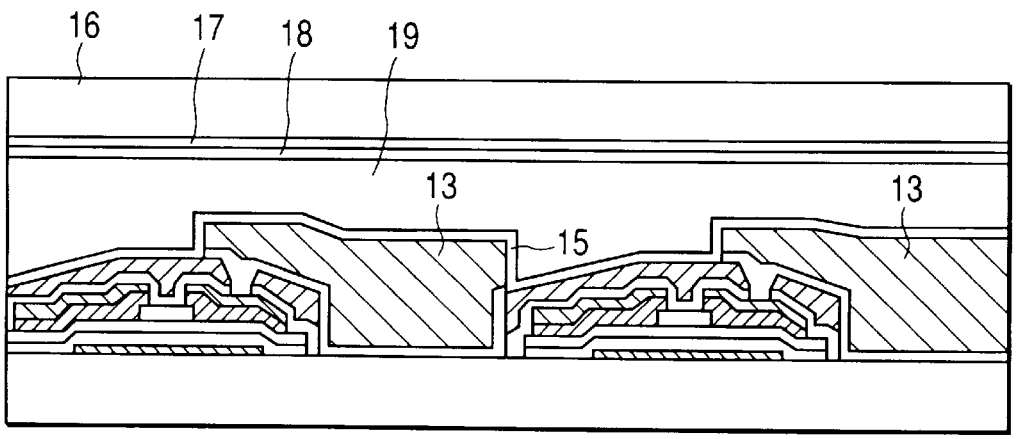

An example of the preparation of the color liquid crystal display device shown in FIG. 1 by the preparation process according to the second embodiment of the present invention will hereinafter be described. The preparation process according to the second embodiment of the present invention is the same as the preparation process according to the first embodiment illustrated in FIGS. 2A to 2K except for Steps (i) to (k). Therefore, Step (I) and subsequent steps thereof will hereinafter be described with reference to the partially cross-sectional views illustrated in FIGS. 3A to 3C. FIGS. 3A to 3C correspond to the following Steps (I) to (K), respectively.

Step (I):

An ITO layer 22 is deposited by sputtering on black matrices 11 and a substrate 1 and connected to drain electrodes 8 through respective contact holes 12. A resin layer 24 having ink receptibility is formed on the whole surface of the ITO layer 22. Further, a resist 25 having a pattern of pixel electrodes is formed thereon. The resin layer 24 has no photosensitivity.

In the preparation process according to the second embodiment, for example, a silicone resin having a disilane structure may preferably be used for the resin layer 24. Specifically, there may be preferably used solvent-soluble organopolysilane such as poly(phenylmethyl)silane, reaction products of bissilylamine having a disilane structure and a bisphenol-type compound, reaction products of a diamine having a disilane structure and a carboxylic acid dianhydride, and (disilanylene)phenylene polymers obtained by the condensation reaction of 1,4-bis(chlorosilyl)benzene and the like.

Step (J):

The ITO layer 22 and the resin layer 24 are patterned at the same time through the resist 25 to form pixel electrodes 14. After removing the resist 25, color inks of red, green and blue are applied to the resin layer 24 patterned at the same time as the ITO layer 22 in the same manner as in Step (j) illustrated in FIG. 2J to form respective color filters 13. The color inks and the applying means thereof are the same as in the preparation process according to the first embodiment.

Step (K):

An alignment film 15 is formed over the whole surface of the TFTs and color filters 13 in the same manner as in Step (k) of the preparation process according to the first embodiment. On the other hand, a transparent common electrode 17 and an alignment film 18 are formed on an opposite substrate 16, and both substrates are arranged in opposed relation to each other. A liquid crystal 19 is charged into a space between both substrates to fabricate the color liquid crystal display device.

According to the preparation process according to the second embodiment, as described above, the patterning for the color filter and pixel electrode is conducted at the same time to form the color filter on the pixel electrode. Therefore, the preparation process of the color filter is greatly shortened, and the color filter can be formed in a state that it has the same form as the pixel electrode and is completely superimposed thereon.

In the preparation processes according to the first and second embodiments, the active matrix type color liquid crystal display devices have been described. However, the present invention is not limited thereto. With respect to other steps and materials than those described in the above embodiments of the present invention, the conventionally known techniques may be applied as they are, so far as the steps of forming the color filters and pixel electrodes according to the present invention are included. In any embodiment, the liquid crystal display device has been described as the transmission type. However, it may also be provided as the reflection type by using a metal for the pixel electrodes 14.

According to the present invention, as described above, the color filters can be formed with good precision and by a greatly shortened process without depending upon the preparation process and type of black matrices. Therefore, the color liquid crystal display devices having excellent color display characteristics can be provided with good yield at low cost.

The present invention will hereinafter be described more specifically by an example.

Example:

TFTs were first formed on a glass substrate composed of borosilicate glass, #7059 (trade name, product of Corning Co.). The TFT array substrate was produced by means of the reverse stagger type a-Si TFT substrate process which is in common use at present.

An ITO layer for pixel electrodes was then formed in a thickness of 200 nm by sputtering on the glass substrate. The ITO layer was connected to drain electrodes through respective contact holes. A solution of a photosensitive resin obtained by adding ammonium bichromate into PVA (polyvinyl alcohol) was applied on the ITO layer by a spin coating method. The coating film thus formed was prebaked at 80° C. for about 10 minutes to form a photosensitive resin layer having a thickness of from 1.5 to 2 $\mu$m.

The photosensitive resin layer was then exposed in an exposure value of from 100 to 200 mJ/cm$^2$ through a photomask having a pattern for pixel electrodes, thereby obtaining a photosensitive resin layer selectively photo-set according to the pattern for pixel electrodes. The substrate having the patterned photosensitive resin layer was then subjected to a developing treatment with purified water at 25° C. for 60 seconds to remove unexposed portions of the photosensitive resin layer. After the substrate was dried at 70° C. for about 10 minutes, exposed portions of the ITO film were etched with a hydrochloric acid type etching solution at about 40° C. The thus-treated substrate was rinsed with purified water and then dried. The portions of the photosensitive resin film and ITO film, which remained after the development and etching, corresponded to individual pixel electrodes and formed a pattern that 1,024×768 electrodes in the form of a rectangle of about 80×250 μm were arranged at a pitch of 10×300 μm.

Color inks of red, blue and green, the color characteristics of which had been controlled for color filters, were applied by turns in that order to the remaining portions (pixel portions) of the photosensitive resin film by means of ink-jet heads of the bubble-jet system to color them. The ink-jet heads used were long heads having 1,408 nozzles manufactured by Canon Inc., and productivity was increased by using such a head every color ink.

After the application of the inks, the photosensitive resin layer was subjected to a dyeing treatment at 40° C. for about 30 seconds. Thereafter, the thus-treated substrate was heat-treated at 180° C. for 30 minutes to cure the respective colored portions of the photo-sensitive resin layer. The thus-treated substrate was then washed to remove the inks adhered to other portions than the pixels.

After conducting the above-described steps, the general process for fabricating a TFT-LCD panel was followed to conduct formation of an alignment film, arrangement of both substrates, charging of a liquid crystal, bonding of polarizing plates and assembly of a module, whereby a good LCD module was able to be obtained.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for the preparation of a color liquid crystal display device charged with a liquid crystal into a space between a substrate having thin film transistors and pixel electrodes, and a substrate opposite thereto, which comprises the steps of:

forming black matrices having ink-repellency on the thin film transistors;

forming an electroconductive layer on the black matrices and on the substrate, on which the pixel electrodes will be provided;

forming a patterned photosensitive resin layer on the electroconductive layer;

patterning the electroconductive layer through the patterned photosensitive resin layer to form the pixel electrodes; and coloring the patterned photosensitive resin layer to form respective color filters.

2. The process according to claim 1, wherein the photosensitive resin is an acrylic resin.

3. The process according to claim 1, wherein a means for coloring the patterned photosensitive resin layer is of an ink-jet system.

4. A process for the preparation of a color liquid crystal display device charged with a liquid crystal into a space between a substrate having thin film transistors and pixel, electrodes and a substrate opposite thereto, which comprises the steps of:

forming black matrices having ink-repellency on the thin film transistors;

forming an electroconductive layer on the black matrices and on the substrate, on which the pixel electrodes will be provided;

forming a resin layer on the electroconductive layer;

forming a patterned resist on the resin layer;

patterning the electroconductive layer and the resin layer at the same time through the patterned resist to form the pixel electrodes; and coloring the patterned resin layer to form respective color filters.

5. The process according to claim 4, wherein a composition forming the resin layer comprises a silicone resin having a disilane structure.

6. The process according to claim 4, wherein a means for coloring the patterned resin layer is of an ink-jet system.

* * * * *

UNITED STATES PATENT AND TRADEMARK OFFICE
CERTIFICATE OF CORRECTION

PATENT NO. : 5,976,734
DATED : November 2, 1999
INVENTOR(S) : NOBUHITO YAMAGUCHI It is certified that error appears in the above-identified patent and that said Letters Patent is hereby corrected as shown below:

ON THE TITLE PAGE

[56] References Cited, under FOREIGN PATENT DOCUMENTS:
"2235901 9/1988 Japan ." should read --63-235901 9/1988 Japan .--.

COLUMN 6:

Line 20, "according to" should read --in--.

Signed and Sealed this

First Day of May, 2001

Attest:

NICHOLAS P. GODICI

Attesting Officer     Acting Director of the United States Patent and Trademark Office